United States Patent [19]
Graham et al.

[11] Patent Number: 5,812,597
[45] Date of Patent: Sep. 22, 1998

[54] CIRCUIT FOR PREVENTING BASE LINE WANDER OF DIGITAL SIGNALS IN A NETWORK RECEIVER

[75] Inventors: Martin H. Graham, Berkeley; Matthew Taylor, Pleasant Hill, both of Calif.

[73] Assignee: Tut Systems, Inc., Pleasant Hill, Calif.

[21] Appl. No.: 638,570

[22] Filed: Jan. 30, 1996

Related U.S. Application Data

[63] Continuation of Ser. No. 535,335, Jul. 11, 1995, abandoned, which is a continuation of Ser. No. 310,230, Sep. 21, 1994.

[51] Int. Cl.[6] .................................................. H04L 25/00
[52] U.S. Cl. ...................... 375/257; 375/258; 333/24 R; 333/177
[58] Field of Search .................................... 375/257, 258, 375/285; 333/24 R, 172, 177, 119; 327/11, 16

[56] References Cited

U.S. PATENT DOCUMENTS

| | | | |
|---|---|---|---|
| 4,717,896 | 1/1988 | Graham | 333/25 |
| 4,800,344 | 1/1989 | Graham | 333/25 |
| 4,823,364 | 4/1989 | Herzog | 375/258 |
| 5,149,144 | 9/1992 | Sutterlin et al. | 375/258 |
| 5,191,300 | 3/1993 | Graham et al. | 330/310 |
| 5,293,400 | 3/1994 | Monod et al. | 375/257 |

FOREIGN PATENT DOCUMENTS

| | | | |
|---|---|---|---|
| 1147943 | 12/1987 | Japan | 375/258 |
| 2268047 | 4/1989 | Japan | 375/258 |
| 4196644 | 11/1990 | Japan | 375/258 |
| 0201642 | 9/1991 | Japan | 375/36 |

*Primary Examiner*—Wellington Chin
*Assistant Examiner*—Conguan Tran
*Attorney, Agent, or Firm*—Blakely, Sokoloff, Taylor & Zafman LLP

[57] ABSTRACT

A receiver for a LAN which uses a transformer for isolation. Base line wander is prevented by use of a positive feedback path which provides a signal that compensates for low frequency loss through the transformer. The feedback path connects the output of the receiver to the secondary winding of the transformer. The time constant of the transformer and terminating resistor L/R equals the RC time constant in the feedback path.

11 Claims, 1 Drawing Sheet

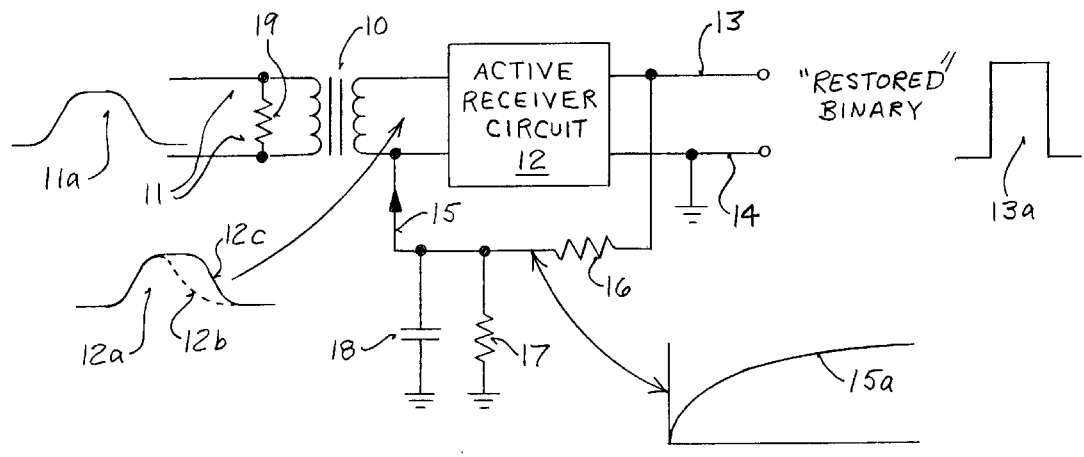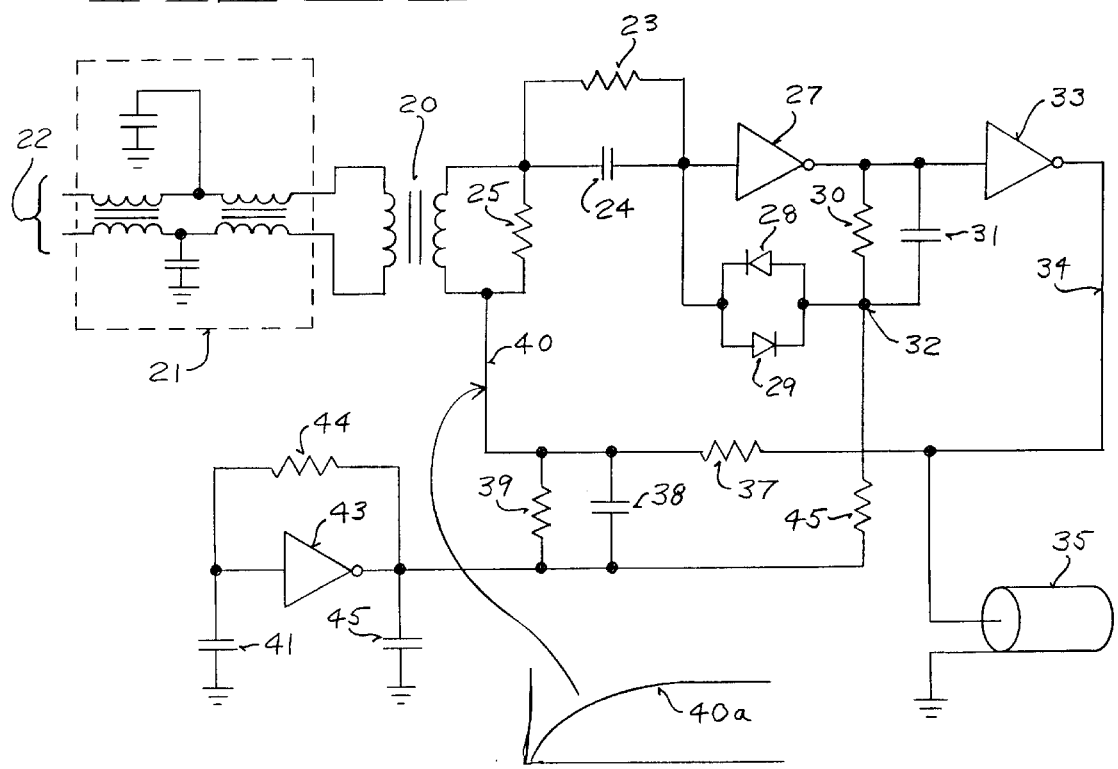

CIRCUIT FOR PREVENTING BASE LINE WANDER OF DIGITAL SIGNALS IN A NETWORK RECEIVER

This is a continuation of application Ser. No. 08/310,230, filed Sep. 21, 1994.

BACKGROUND OF THE INVENTION

1. Field of the invention.

The invention relates to the field of digital receivers which use transformers for isolation, particularly receivers used in networks.

2. Prior art

Network receivers such as those which receive data from a local area network (LAN) are commonly used to provide equalization and a comparator function which reshapes the waveform into a more ideal square wave. Commercially available integrated circuits perform these functions.

It is often desirable to use a transformer for coupling the receiver to the network since transformers provide isolation, for example, to isolate one power supply from another. A problem with transformers is that they have poor low frequency response. This can result in the loss of data and/or require that certain data sequences not be used.

The loss of these lower frequencies causes the D.C. level to wander (i.e., base line wander). For instance, where a high signal level represents a binary one, the waveform representing a string of binary ones will decay or "droop" making the detection of data difficult if not impossible. After this drooping a subsequent binary zero will be at a lower level than a binary zero which follows a single binary one. This adds to the problems of detection.

Also, the inductance associated with the transformer may cause the initial pulses in a data packet to be lost until the inductance and other elements in the receiver reach a quiescent condition. This may necessitate the use of non-data header bits.

As will be seen, the present invention uses a transformer and a feedback mechanism to compensate for the low frequency response of the transformer thereby restoring the base line to the data.

One of the circuit stages used in the currently preferred embodiment of the present invention uses back-to-front coupled diodes for equalization. This general concept is shown in U.S. Pat. No. 5,191,300, FIG. 3. Other related prior art known to applicant is U.S. Pat. Nos. 4,717,896; 4,800,344 and U.S. Pat. No. Application Serial No. 092,721; filed Jul. 16, 1993, entitled "Flat Cable to Flat Parallel Wire Cable".

SUMMARY OF THE INVENTION

A receiver for coupling to a LAN or the like is described. A transformer having a primary winding is coupled to receive the signal from the network. A circuit for restoring the shape of the signal received from the network is coupled to the secondary winding of the transformer. A feedback path couples the output of the circuit to the transformer to provide positive feedback which compensates for low frequency component signal loss occurring in the transformer. In operation, the D.C. level seen by the receiver remains constant as long as, for instance, a string of binary ones is being received. That is, the feedback makes up for the decay caused by the transformer.

In the presently preferred embodiment, the time constant associated with the ratio of the inductance of the transformer and the network terminating resistor (L/R) approximately equals the RC time constant associated with the feedback path.

BRIEF DESCRIPTION OF THE DRAWINGS

FIG. 1 is a general block diagram showing the feedback path of the present invention.

FIG. 2 is an electrical schematic showing the current preferred embodiment of the present invention.

DETAILED DESCRIPTION OF THE PRESENT INVENTION

A receiver for coupling to a network such as a LAN is described. In the currently preferred embodiment, specific component values are described in order to provide a thorough understanding of the present invention. The present invention, however, may be practiced without these specific values. Additionally, other components well known, such as inverters, are not shown in detail form in order not to unnecessarily obscure the present invention. Also for purposes of describing the present invention, reference is made to receiving a string of binary ones, it will be apparent that such reference is for explanation and does not limit the use of the invention.

OVERVIEW OF THE PRESENT INVENTION

In FIG. 1 a line 11 which is assumed to be coupled to a LAN or other network is illustrated. It is assumed that data is transmitted over line 11 and is received by the receiver circuit 12. The data, typically in digital form may be, for example, transmitted in accordance with an Ethernet standard or other standard. A single pulse 11a representing, for instance a binary one, is shown in FIG. 1 to illustrate that the waveform tends to become rounded from its original square wave shape due in part to the distributed reactance in the line 11. The line 11 is often a twisted pair line, flat "Silver Satin" cable, coaxial cable or the like.

The line 11 is coupled to the primary winding of a transformer 10. The secondary winding of this transformer is coupled to a receiver circuit 12. Receivers are commonly used in networks to provide equalization, amplification and a comparator function to restore the square-like shape of the signal at the output of the receiver circuit 12. For example, the waveform on line 13 at the output of the receiver circuit 12 is shown as the restored binary signal 13a in FIG. 1. The other output line 14 from receiver circuit 12 is coupled to ground.

While transformers, such as transformer 10 provide excellent D.C. isolation their low frequency response is poor and consequently there can be distortions in a signal coupled through the transformer. This is shown in FIG. 1 by the section 12b of the waveform 12a. More specifically, if the waveform 11a is coupled through the transformer 10, the waveform on the secondary winding of the transformer, will drop off since the low frequency components needed to sustain the upper part of the waveform are attenuated by the transformer 10.

With the present invention, a feedback signal developed from the restored binary signal on line 13 is coupled to the secondary winding of the transformer 10 to restore the low frequency components attenuated by the transformer. When this occurs the input to the receiver circuit 12 is represented by waveform 12a with section 12c of this waveform instead of the section 12b.

In the currently preferred embodiment of the present invention, a positive D.C. feedback path from line 13 to the secondary winding of the transformer 10 is used. There is an RC time constant associated with this feedback path determined by the resistors 16 and 17 and the capacitor 18.

Additionally, there is a time constant (L/R) associated with the transformer 10 and a terminating resistor 19 used to terminate the line 11. In the currently preferred embodiment, the time constant L/R is approximately equal to the RC time constant associated with the feedback path. Also, the amount of feedback determined by the values of resistors 16 and 17 is selected so that the feedback compensates in magnitude for the low frequency loss.

The waveform on line 15 which is coupled to the secondary winding of the transformer 10 is shown by waveform 15a. Note that initially the amount of feedback is small and that the feedback increases with time as capacitor 18 charges. This increasing feedback provides the compensation for, for instance, a string of binary ones. The input to the receiver circuit 12 thus remains at a constant D.C. level during the string of binary ones. This allows more reliable detection of the binary ones and prevents the base line from wandering.

When the feedback is occurring and a binary zero is coupled to the receiver circuit 12, the output of the circuit drops to zero and the positive feedback ceases. The high-to-low pulse from the network essentially discharges capacitor 18.

CURRENTLY PREFERRED EMBODIMENT

In FIG. 2 the currently preferred embodiment includes a receiver having two active devices, inverters 27 and 33. The input signal from the network is coupled on line 22 through a balun 21 to the primary winding of a transformer 20. (Baluns are shown in U.S. Pat. Nos. 4,717,896 and 4,800, 344.) The secondary winding of the transformer is coupled to the input terminal of the inverter 27 through the resistor 23 and capacitor 24. A network terminating resistor 25 is shown coupled across the secondary winding of the transformer. (The terminating resistor may be coupled to either the primary or the secondary winding of the transformer).

The inverter 27 operates as a linear device and is biased for this purpose by the inverter 43 and resistor 44 which is coupled between the input and output of inverter 43. The capacitors 41 and 45 couple the input and output terminals, respectively, of the inverter 43 to ground. The output of the inverter 43 is coupled through the resistor 45 to the node 32.

Negative feedback for the inverter 27 is provided through the resistive divider formed by resistors 30 and 45 and the back-to-front coupled diodes 28 and 29. The capacitor 24 and diodes 28 and 29 serve to differentiate the input signal to the inverter 27. This technique has been previously used as shown in U.S. Pat. No. 5,191,300. The resistor 23 provides a low frequency path for the data signal to bypass the differentiation caused by capacitor 24. The 1.8K value is selected for 400 feet of 24 gauge unshielded twisted pair. A high value is used for shorter lines. Conversely, a lower value resistor is used if line length is greater. The capacitor 31 is used to prevent oscillations in the circuit.

The inverter 33 operates as a digital device and is coupled to receive the output of inverter 27. The output of the inverter 33 provides the restored binary signal shown by waveform 13a of FIG. 1. This signal is coupled by line 34 to the output line 35. This signal is also fed back in a positive D.C. feedback path through the resistor 37 and line 40 to the secondary winding of the transformer 20. The resistors 37 and 39 and the capacitor 38 control the rise time of the feedback signal and the magnitude of this feedback. The resistor 39 and capacitor 38 are coupled between line 40 and the biasing potential from the output of the inverter 43.

The resistors 37 and 39 divide the output from line 34 such that the magnitude of the positive feedback signal compensates for the low frequency loss in the transformer 20. The RC constant associated with resistors 37 and 39 and capacitor 40 is approximately equal to the L/R time constant associated with the transformer and the terminating resistor 25. This provides a rise time of the feedback signal equal to the decay time of a signal coupled through the transformer. The waveform produced on line 40 is shown by waveform 40a in FIG. 2. (Note in general the resistance in the output stage of inverter 33 and the resistance of the secondary winding of transformer 20 are low compared to the resistor 37, 39 and 25 and can be ignored.)

In an embodiment where the data rate on the line 22 is approximately 50 Mb per second and the terminating resistor 25 is 100 ohms with a 1:1 ratio between the turns in the primary and secondary windings of transformer 20, the following components are used for the circuit of FIG. 2.

R23=1.8K ohms
R30=200 ohms
R37=1.1K ohms
R39=110 ohms
R44=10 ohms
R45=47 ohms
C24=22 pF
C31=22 pF
C38=0.1 micro F
C45=10 micro F
C41=5 pF
Inverters 27,33 and 43—Part No. 74HCO4
Diodes 28,29 are 0.3V diodes If the transformer has an inductance of approximately 1 milli henry and the terminating resistor is equal to 100 ohms the time constant for L/R and RC of the feedback path are both approximately equal to 10 micro seconds.

In operation when a binary 1 (high level signal) is transmitted through the transformer 20 from lines 22 and balun 21 the signal is essentially differentiated and applied to the inverter 27. The negative feedback provided through the diodes 28, 29 and resistor 30 is self-limiting, that is, once the diodes conduct the feedback becomes greater and the output of the inverter 27 is limited.

The output of the inverter 27 is further shaped by the inverter 33, to provide a more binary-like signal that represents the signal transmitted over the network to the circuit of FIG. 2.

When the output of the inverter 33 first rises in potential the positive feedback is essentially zero since initially the capacitor 38 must be charged (ignoring biasing potentials). As capacitor 38 charges the feedback on line 40 increases in magnitude. This increase in magnitude substantially compensates for the decay associated with coupling a D.C. signal (the binary 1) through the transformer 20. Thus, from the standpoint of the secondary winding, the D.C. signal remains essentially constant. That is, it remains at the same level it was at when the leading edge of the binary one was first received.

Thus, with the positive feedback provided by the present invention, a string of binary ones can be transmitted through the transformer 20 and still will retain the same waveform as that transmitted to the network on line 34. Where a binary zero follows, its level will not be a function of the number of binary ones that was previously received. That is, the base line of the transmitted signal will be preserved. Also, with the signal restoration provided by the present invention, in most instances the first bits of a packet can be sensed. (Often, in the prior art, it is necessary to transmit a plurality of bits in a header to allow signals in a receiver to stabilize before data can be sensed.)

In some instances, low frequency components in a waveform are intentionally suppressed, for example, where it is necessary to suppress AC power line noise. This makes it even more difficult to couple the data through a transformer. The present invention helps in this situation since there is restoration of the low frequency components in the waveform.

The present invention has been described for a two level signal. The principles of the present invention can be used for a three level signal or a signal with more than three levels. For a three level signal (assume 0, 2 and 4 volts) two feedback paths may be used; one for a 2 volt signal another for a 4 volt signal. When one of these two levels is received its level is immediately detected and the appropriate feedback path is coupled to provide the needed feedback for that signal level.

Thus, a receiver particularly adaptable for a LAN has been described which permits data to be coupled through a transformer without losing the low frequency components of the signal.

We claim:

1. A receiver for coupling to a network comprising:

a transformer having a primary winding coupled to receive a signal from the network;

a circuit for restoring the shape of the signal received from the network, the circuit being coupled to a secondary winding of the transformer; and a positive, direct current feedback path coupled from an output of the circuit to the transformer for providing a feedback signal which compensates for low frequency components in the signal from the network lost through the transformer.

2. The receiver defined by claim 1 wherein there is a first time constant associated with the transformer.

3. The receiver defined by claim 2 wherein there is a second time constant associated with the feedback path and wherein the first and second time constants are approximately equal.

4. A receiver for coupling to a network comprising:

a transformer having a primary winding coupled to receive a signal from the network;

a terminating resistor coupled to the transformer, the terminating resistor and transformer having a first time constant;

a circuit for shaping the signal received from the network, an input of the circuit being coupled to a secondary winding of the transformer; and a positive, direct current feedback path coupled from an output of the circuit to the secondary winding of the transformer, the feedback path having a second time constant approximately equal to the first time constant.

5. The receiver defined by claim 4 wherein the circuit includes a first active device operating generally as a linear device and a second active device operating generally as a binary device.

6. The receiver defined by claim 5 wherein the signal from the network is differentiated at the first active device, and where an output of the first active device is coupled to an input of the second active device.

7. The receiver defined by claim 6 wherein the first and second active devices are inverters.

8. The receiver defined by claim 4 wherein the second time constant is determined by resistors and at least one capacitor in the feedback path.

9. The receiver defined by claim 8 wherein the magnitude of a feedback signal in the feedback path is determined by the resistors.

10. The receiver defined by claim 4 wherein the circuit for shaping uses negative feedback and back-to-back diodes.

11. The receiver defined by claim 1 where the circuit for restoring uses negative feedback in a negative feedback path having back-to-back diodes.

* * * * *